United States Patent [19]
Likins, Jr.

[11] 4,328,073
[45] May 4, 1982

[54] BATCH DISTILLATION

[75] Inventor: Merle R. Likins, Jr., Bartlesville, Okla.

[73] Assignee: Phillips Petroleum Company, Bartlesville, Okla.

[21] Appl. No.: 221,122

[22] Filed: Dec. 29, 1980

[51] Int. Cl.³ .............................................. B01D 3/42
[52] U.S. Cl. ........................................ 203/2; 62/21; 203/3; 203/DIG. 18; 208/DIG. 1
[58] Field of Search ................ 364/501; 208/DIG. 1; 203/DIG. 18, 1, 2, 3; 196/132; 62/21, 37; 202/160

[56] References Cited

U.S. PATENT DOCUMENTS

| | | | |
|---|---|---|---|
| 3,268,420 | 8/1966 | Webber et al. | 203/2 |
| 3,272,722 | 9/1966 | Walker | 203/2 |
| 3,294,648 | 12/1966 | Lupfer et al. | 203/2 |
| 3,364,731 | 1/1968 | Hook | 203/DIG. 18 |
| 3,394,053 | 7/1968 | Shinsky | 202/160 |
| 3,428,528 | 2/1969 | Oglesby et al. | 203/1 |
| 3,463,725 | 8/1969 | MacFarlane et al. | 208/DIG. 1 |
| 3,509,729 | 5/1970 | Lupfer | 62/37 |

*Primary Examiner*—Frank Sever

[57] ABSTRACT

A batch distillation operation is automatically controlled from a start-up mode to a shut-down mode.

17 Claims, 7 Drawing Figures

FIG. 3
(START-UP MODE)

FIG. 4 (PRODUCTION MODE)

BATCH DISTILLATION

BACKGROUND OF THE INVENTION

Various computer control systems for operating continuous distillation columns are known. Some systems utilize flow controllers responsive to temperature, pressure, composition and flow rate measurements. Other systems use enthalpy computations to generate flow control signals.

Frequently, batch distillations have to be carried out. Usually, such batch distillations are carried out by manually operating a distillation column. Since small computers have become more and more economical, an automatic system for operating a batch distillation process would be desirable.

THE INVENTION

It is thus one object of this invention to provide an automatic batch distillation control process.

A further object of this invention is to provide a batch distillation apparatus which allows the distillation of a product and the separate recovery of individual distillation cuts in an automatic manner.

These and other objects, advantages, details, features and embodiments of this invention will become apparent to those skilled in the art from the following detailed description of the invention, the appended claims and the drawings in which FIGS. 3 to 7 show the control system in detail.

In accordance with this invention, a batch distillation process is provided which involves a start up operation, total reflux operation, a production operation, and a shut-down operation. In the start-up operation, the kettle of a distillation column hereinafter referred to as a column is automatically heated, e.g. with steam. During the start-up operation, the overhead effluent line of the column is automatically maintained in a closed condition so that all of the overhead effluent is condensed and recycled into the column. At least one distillation process parameter is determined automatically during the start-up period and a start-up signal is generated responsive thereto. This start-up signal is automatically compared with a start-up setpoint.

During the production operation, a production signal is automatically generated when the start-up signal has reached or exceeded the start-up setpoint. Responsive to the production signal, the overhead effluent line is opened and part of the overhead effluent is directed from the column to one of a plurality of receptacles. The overhead effluent is preferably directed to a receptacle, e.g. a storage tank, in a flow controlled manner. Another possibility is a composition controlled flow, i.e. a flow control wherein the overhead flow stream directed to the receptacle is manipulated to keep the composition of the stream within given limits. The column is operated in an automatic way such as to recover one or more separate product streams from the overhead effluent line. At least one operational parameter is automatically determined and a shut-down signal is generated responsive thereto.

The operation of the column is switched to the shut-down operation when an operational parameter or operational parameters determined have reached a given value. Responsive to the shut-down signal, the column is shut down. Finally, the kettle product is removed from the column.

More specifically, during the start-up mode the desired quantity of material to be separated is charged to the column. The material charged may be a hydrocarbon mixture. The distillation is effected by heating the kettle or bottom of the column. This is preferably done by passing steam through a reboiler. The flow of steam through the reboiler or any other heat input to the kettle is advantageously controlled by measuring the pressure differential between the top and the bottom of the column and controlling the heat input so that this pressure drop will be at a specific value.

The switching from the start-up operation to the production operation is carried out responsive to a start-up signal when the start-up signal equals or exceeds a start-up set point. It is, however, presently preferred to carry out the process in such a manner that the production signal which causes the switching from the start-up operation to the production operation of the distillation process is generated when both the start-up signal has reached the start-up set point and an extraneous switch signal has also been provided. This extraneous switch signal may be a signal generated manually by an operator.

It is presently preferred to determine at least one temperature of the column and to generate the start-up signal responsive thereto. Advantageously, the temperature of the column is determined at least at three positions thereon, e.g., the temperature at the top, at an intermediate location and at the bottom, and corresponding temperature signals are generated therefor. These temperature signals are compared individually with respective temperature setpoint signals. As soon as the temperatures exceed the setpoint temperatures, represented by respective signals, the production signal mentioned, which may cause the switching of the operation from the start-up mode to the operation mode, will be generated. During the operation mode, at least part of the overhead effluent is directed to two or more receptacles. The switching of the effluent from one receptacle to another is carried out responsive to a distillation process parameter. Preferably, one or more of the following control operations is carried out during the operation mode.

The temperature at the top of the column is determined and a top-temperature signal representative of this temperature is automatically generated. The top-temperature signal is compared with one or more top-temperature setpoint signals. Whenever the top-temperature signal reaches or exceeds one of the top-temperature setpoint signals, the overhead effluent flow is directed to a different receptacle. Furthermore, the pressure under which the column is operated may be controlled and switched from one given pressure to a next given pressure depending upon the top-temperature of the column. Thus, for example, the column can be operated initially under atmospheric pressure and, after the top-temperature reaches a certain level, the operating pressure for the column may be switched to a lower pressure, e.g. by connecting the top section of the distillation column with a vacuum source.

Usually, the flow of the overhead effluent is flow-rate controlled. However, for the main product stream, it is frequently desirable to determine the composition of the overhead stream and control the flow responsive thereto so that the composition stays either constant or maintains a given maximum content of a certain ingredient.

The operation parameter that is used for generating the shut-down signal is preferably a composition of the overhead stream of the columns. Responsive to the shut-down signal, the operation is switched from the production operation to the shut-down operation. Thus, when the overhead stream of the column reaches a specific composition beyond a given setpoint therefor, the shut-down signal is generated and the column is automatically shut down responsive to this signal. The shut-down operation also includes the closing of the previously operational receptacle, and preferably also includes a deactivation of the pressure controller of the column as well as the heating control loop such as to terminate further heat input into the column.

Another possible operation of the distillation process resides in continuing to direct the overhead effluent to yet another receptacle after the composition of the overhead effluent stream has exceeded a setpoint therefor. In this variation, the liquid level in the column can be used for the generation of the shut-down signal. Thus, when the liquid level falls below a setpoint, the shut-down operation is carried out as described above.

The following description of the specific embodiment of this invention is intended to illustrate further preferred features thereof.

Figure 1:
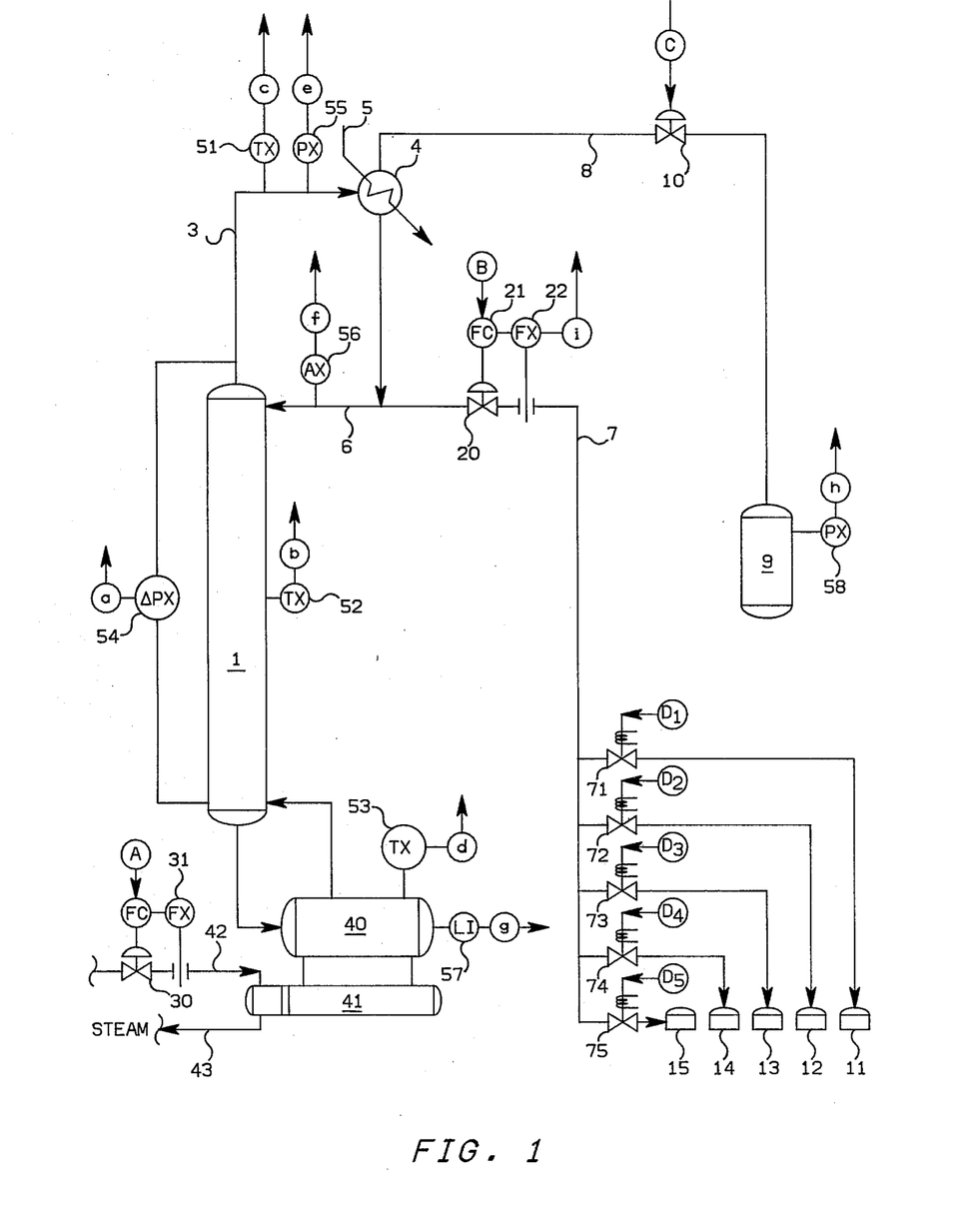
FIG. 1 shows the distillation column with the various process parameter measurement units as well as the various controlled valves.
Figure 2:
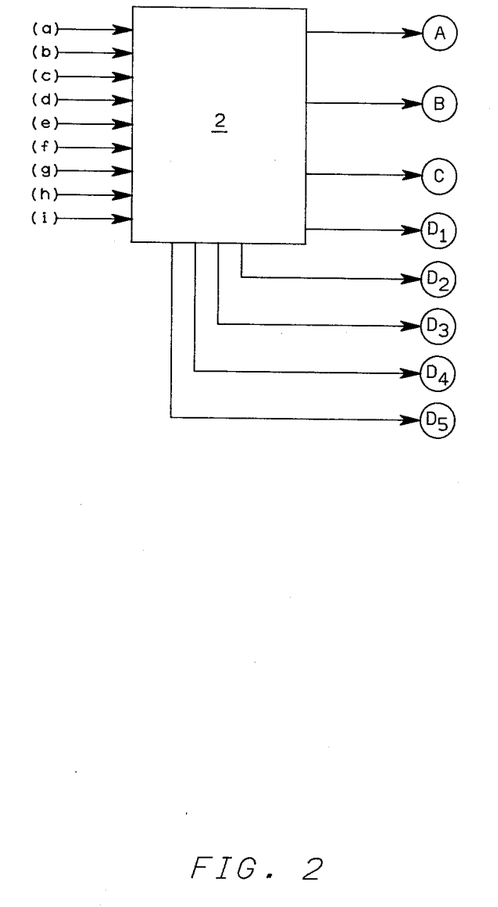
FIG. 2 is a schematic representation of the control system.

The batch distillation system of this invention is schematically shown in FIGS. 1 and 2. The operation of column 1 is carried out in a batchwise manner controlled from a control system 2 (FIG. 2). The control system selects between a plurality of software programs allowing the operation of the column to be carried out through the following modes:

(1) Start-up
(2) Total Reflux
(3) Normal Operation
(4) Shut-down

It should be noted that the total reflux mode (2) is optional. It should also be noted that each of the software programs can be initiated by an operator's signal, e.g. by pushing a bottom on the control panel of a computer carrying out the master program as well as the software program subroutines.

In FIG. 1, the column 1 is shown with an overhead effluent line 3. The overhead effluent is condensed in an overhead condensor 4 which is cooled, e.g. by cooling water supplied via conduit 5. The condensed effluent from the overhead condenser 4 is in part recycled to the column 1 via line 6 and can in part be forwarded via line 7 to one of several receptacles 11 to 15. The flow in line 7 is controlled by valve 20 whereas the receptacles to which the condensed overhead flows is selected by valves 71 to 75.

Absolute pressure in the column is controlled by line 8. This is achieved by applying a vacuum from source 9 and controlling the pressure through line 8 by means of valve 10.

The column 1 is operated by reboiling a kettle 40 which frequently may be simply the bottom area of the column 1. The kettle 40 is reboiled by means of a steam reboiler 41 which is heated by steam introduced via line 42. Steam or condensed steam is withdrawn from the reboiler 41 via line 43. The flow of steam into the reboiler 41 is controlled by valve 30.

The parameters of the distillation process that are used for the control system are the following:

(1) the temperature in the top of the distillation column is automatically determined and a top-temperature signal is generated by a top-temperature signal generator 51, e.g. a thermocouple. The top-temperature signal, optionally after a conversion, is used as the control system input (c) as shown in FIGS. 1, 2, 3, 5.

(2) The intermediate temperature of the column is automatically determined and a corresponding intermediate-temperature signal is generated by the intermediate-temperature signal generator 52, which may also be a thermocouple. The intermediate-temperature signal, after an optional transformation, is utilized as the computer input (b), see FIGS. 1, 2, 3.

Figure 3:
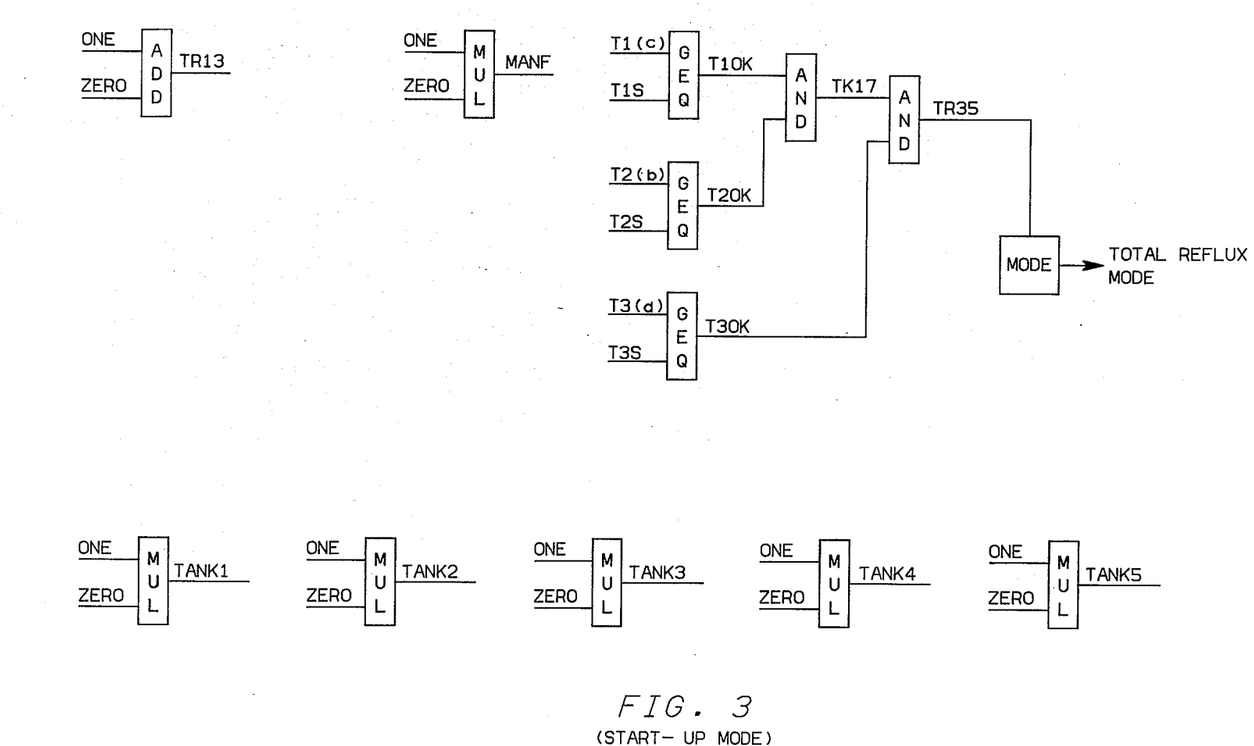
FIG. 3 shows the start-up mode control loop.

(3) The temperature at the bottom of the column 1 (or respectively the temperature in the kettle) is automatically determined and a bottom-temperature signal generator 53 which, after an optional transformation, is introduced into the computer input (d), see FIGS. 1, 2, 3.

Figure 5:
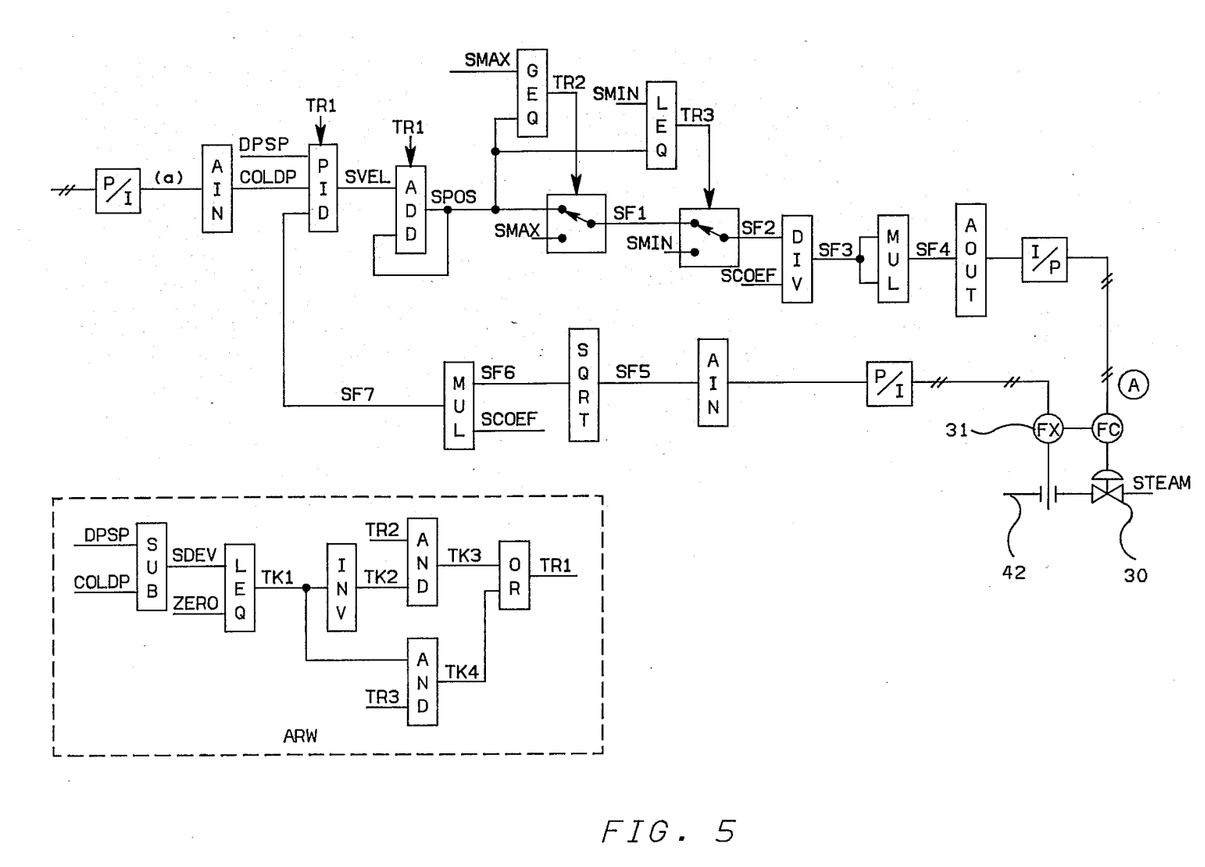
FIG. 5 shows the steam flow control loop.

(4) The pressure difference between the top and the bottom of the column is automatically determined and a pressure-difference signal is generated by pressure-difference signal generator 54 which, after an optional transformation, is introduced into the computer input (a), see FIGS. 1, 2, 5.

(5) The pressure at the top of the column is also automatically determined and a top-pressure signal is generated by top-pressure signal generator 55. The top-pressure signal, after an optional transformation, is introduced via input (e) into the computer, see FIGS. 1, 2, 6.

(6) The composition of the condensed overhead effluent in line 6 is automatically determined and a composition-signal is generated. The signal generated in the composition-signal generator 56, which may be a chromatographic analyzer, after an optional transformation, is introduced into the computer by input (f), see FIGS. 1, 2, 4, 7

(7) The level of the liquid in the column 1 (or respectively in the kettle 40) is determined and a liquid-level signal is generated. The signal from the liquid-level signal generator 57, after an optional transformation, is fed to the computer via input (g), see FIGS. 1, 2, 4.

(8) The pressure in the vacuum source 9 is automatically determined and a vacuum-pressure signal is generated. The signal from the vacuum-pressure signal generator 58, optionally after a transformation, is fed to the computer via the computer input (h), see FIGS. 1, 2, 6.

Figure 7:
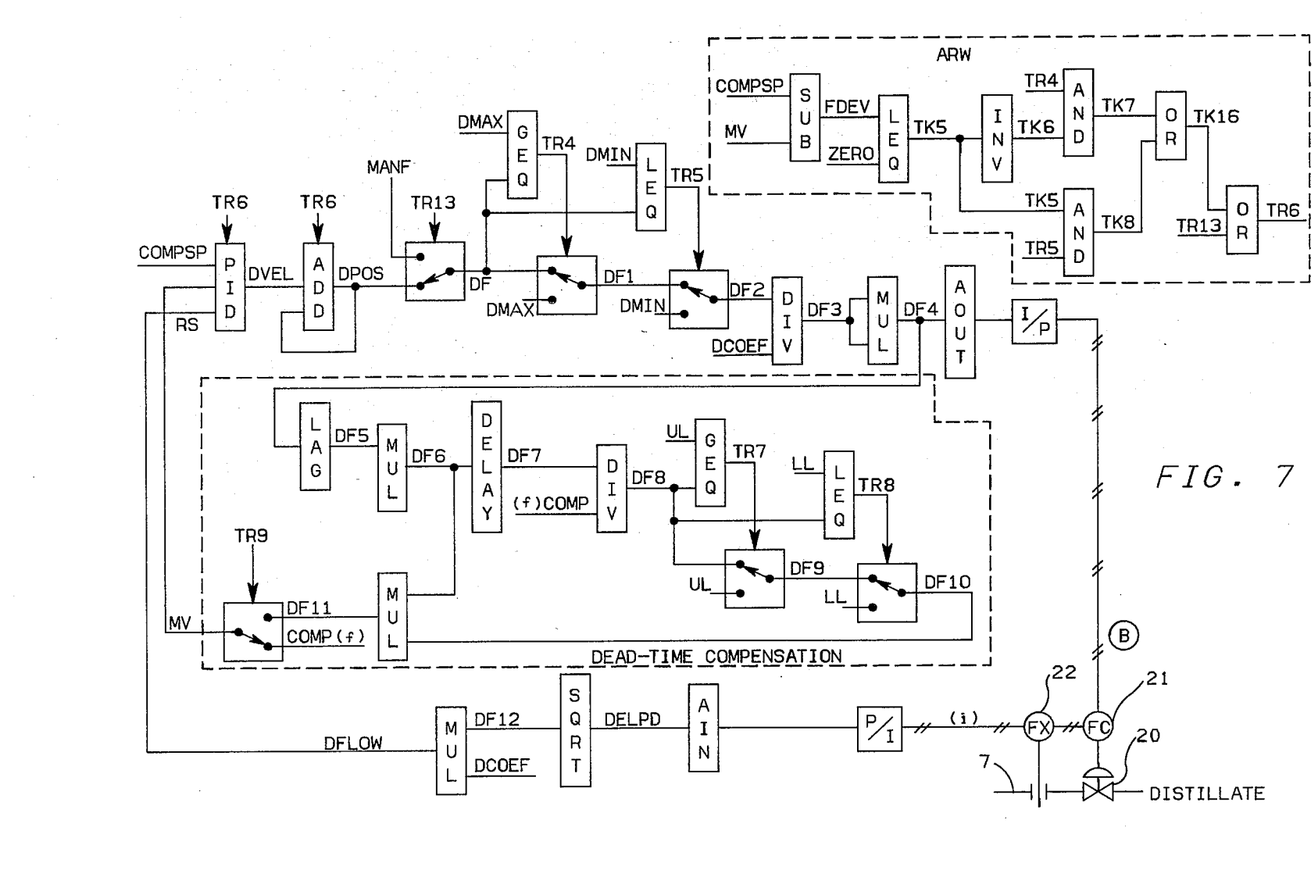
FIG. 7 shows the distillate flow control loop.

(9) A flow rate signal (i) is provided to the computer by flow rate transmitter 22, see FIGS. 1, 2, 7.

Responsive to a controller operation to be described, the following parameters of the batch distillation process are controlled.

(1) The flow of steam in conduit 42 is controlled by a control signal from the output A. This control signal may be the setpoint signal for a flow controller 31, see FIGS. 1, 2, 5.

(2) The flow of the overhead effluent to the receptacles 11 to 15 via line 7 is controlled by manipulation of valve 20 by flow controller 21. The control is achieved by a control signal furnished from output B from the computer which may be the setpoint signal for flow controller 21, FIGS. 1, 2, 7.

(3) The column pressure is controlled by valve 10. Valve 10 is manipulated by signal C from the computer output, see FIGS. 1, 2, 6.

(4) The flow of condensed overhead effluent is additionally directed to respective ones of receptacles 11 to 15 by manipulation of corresponding valves 71 to 75 by corresponding control signals $D_1$ to $D_5$. These signals $D_1$–$D_5$ are obtained from digited computation signals TANK1, TANK2, TANK3, TANK4, and TANK5 by a multiplication subroutine with one input being ONE and the other input being the TANK input, followed by a digital-to-analogue converter not shown. See FIGS. 1, 2, 5.

FIG. 2 schematically shows the control system with the computer inputs a-i as described above and the manipulating outputs A, B, C, $D_1$, $D_2$, $D_3$, $D_4$, $D_5$. Before the control system is described in detail with reference to the drawings, the process will be described in the following with respect to the individual modes of operation.

In the following, reference will be made to various elements such as "AND," "OR" etc. These are preferably parts of subroutines of a digital computer program. Only those portions of the computer program will be functionally described in the following which are essential to show the preferred embodiment of this invention; other portions are shown in the drawing and will be readily understood by a person skilled in the art from the drawing and the following list of abbreviations.

Abbreviations used in the Drawing

AX: Analyzer; generates a signal representative of the composition of the stream analyzed
TX: Temperature signal generator
FX: Flow signal generator
FC: Flow controller; manipulates the actual flow, e.g. by means of a valve, so that the actual flow rate is equal to the flow rate setpoint.
LI: Liquid level sensor; generates a signal representative of the liquid level in the respective container.
PX: Pressure signal generator
$\Delta$PX: Pressure difference signal generator
ADD: Adder; the output is the sum of the two inputs
AIN: Analogue-to-digital converter (input unit)
AND: AND logic; the output is ONE only if both inputs are ONE
AOUT: Digital-to-analogue converter (output unit)
DELAY: DELAY, the input is delayed a specified time before being output.
DIV: Divider, the output is the ratio of the two inputs
DMAX: Operator entered setpoints for maximum
DMIN: and minimum
GEQ: Comparison/logic; the output is ONE only if one preselected input is Greater than or EQual to the other input; otherwise the output is ZERO.
INV: Inversion logic; converts ONE to ZERO and ZERO to ONE
I/P: Current to pressure converter; for pneumatic valve manipulation
LEQ: Comparison logic; the output is ONE only if one preselected input is Less than or EQual to the other input; otherwise the output is ZERO.
LL: Lower limit, an operator entered value for the composition of the distillate stream.
MUL: Multiplier; the output is the product of two inputs.
OR: OR-logic; the output is ONE if one or both inputs are ONE and is ZERO if both inputs are ZERO.
P/I: Pressure-to-current converter; for input to AIN.
PID: Proportional-Integral-Derivative controller.
PMAX: Operator entered value for maximum or respectively
PMIN: minimum pressure.
SMAX: Operator entered setpoints for maximum and
SMIN: minimum steam flow.
SQRT: SQuare RooT subroutine; the output is the square root of the input
SUB: Subtractor; the output is the difference between the inputs.
UL: Upper limit, an operator entered value for the composition

START-UP MODE

To start up the batch distillation operation, a desired quantity of fluid is charge to the batch distillation column. This fluid may be a hydrocarbon mixture. During the start-up operation, the valves 71, 72, 73, 74 and 75 to all of the product receptables 11 to 15 are closed. The control valve 20 for the condensed overhead stream is also closed. During the startup, all control loops begin to function. The control loops are mainly the pressure differential control loop, the distillate flow control loop and the column pressure control loop. The differential pressure control loop controls steam flow into the reboiler 41.

During the initial heating operation valve 20 is closed and the column is operated under total-reflux conditions, i.e. all of the condensable overhead effluent in line 3 is condensed in overhead condenser 4 and reintroduced via line 6 into the column.

Three temperatures are sensed respectively at the top, middle and bottom sections of the column and the respective temperature signals are generated by units 51, 52 and 53. When the three temperatures become equal to or greater than the respective setpoints, the computer will generate a signal that allows the switching to the next mode. The switching to the next mode of operation can be done either automatically or done only after an extraneous additional signal is provided. The extraneous signal may be an operator generated switch signal.

TOTAL REFLUX

This mode of operation holds the process essentially at the same point that was obtained at the end of the start-up mode. If the differential pressure of the column is not at a setpoint, the total reflux mode will operate to obtain the desired differential pressure. When the desired condition is reached the computer generates another signal which allows moving to the next mode. This switching to the next mode can be automatically achieved or it can be achieved after an extraneous switch signal, which may be an operator generated switch signal, has been given.

PRODUCTION OPERATION

During the production operation or the operation which may be characterized as the "normal mode" the valve 71 to the storage tank 11 is initially open while all the other valves 72 to 75 to the other storage tanks remain closed. The flow rate of the distillate product in line 7 is controlled at a constant value. The batch distillation operation under these conditions achieves the removal of the light components of e.g. a hydrocarbon mixture.

When the top temperature in the column reaches a predetermined level, valve 71 is closed and valve 72 is opened to allow the distillate product to flow at a flow rate controlled mode into the storage tank 12. When the top temperature in the column has reached a still higher level or setpoint valve, 72 is closed and valve 73 is opened to connect the overhead condensate line 7 with tank 13. Whereas the column has previously been operating at atmospheric pressure, the setpoint for the pressure controller now is set automatically at a predetermined vacuum setting. This causes valve 10 to be opened to an extend sufficient to maintain the reduced pressure in the top of the distillation column 1.

When the composition of the distillate product stream in line 6 reaches a setpoint which may either be a minimum value for one ingredient or a maximum value for another ingredient, valve 73 is closed and valve 74 is opened. At that time also the composition controller is activated and in conjunction with the chromatograph and a dead time compensation routine (described in more detail in U.S. Pat. No. 4,054,780) manipulates the distillate product flow rate in order to control the distillate composition. Thus, a product of well defined composition is collected in tank 14.

When the distillate composition exceeds the setpoint for a given component and the flow control can no longer maintain the effluent stream at the desired composition valve 74 is closed and valve 75 is correspondingly opened. Then the distillate product is withdrawn via line 7 and passed into storage tank 15 in a flow controlled manner again. The distillation column is operated under these conditions until the liquid level reaches a set lower level. At that point the level signal generator 57 generates a shut-down signal and the shut-down mode is started.

SHUT-DOWN MODE

During the shut-down mode operation, the valves 71 to 75 to all product tanks 11 to 15 are closed, the setpoint of the flow controller 21 is set to 0, i.e. valve 20 is closed and the pressure differential controller as well as the column pressure controller are deactivated. This causes valves 10 and 30 to be closed so that no more steam is introduced into the reboiler and the distillation column 1 is returned to normal atmospheric pressure conditions. At the end of the operation, the kettle is emptied.

In the following, the individual control loops are described in more detail.

CONTROL SYSTEM

The Control System consists of four MODES: START-UP, TOTAL REFLUX, NORMAL, and SHUT-DOWN. Also three CONTROL LOOPS are included: COLUMN PRESSURE, COLUMN PRESSURE DIFFERENTIAL and COMPOSITION CONTROL. These are shown in FIGS. 3 to 7. For all switches shown in the drawing, the switch position is "down" when the operating signal (arrow) carries ZERO and is "up" when the operating signal (arrow) carries ONE.

START-UP MODE

FIG. 3 is a diagram of the START-UP MODE. TR13 is the output of an addition block, whose inputs are the constants 1.0 and 0.0; therefore TR13 is 1.0. This signal puts the COMPOSITION LOOP in flow control mode as shown in FIG. 7. MANF is the output of a multiplication block whose inputs are the constants 1.0 and 0.0. This signal becomes the distillate flow rate as shown in FIG. 7. Therefore, the column operates at total reflux in the START-UP MODE.

TANK1, TANK2, TANK3, TANK4, TANK5 are the outputs of multiplication blocks whose inputs are 1.0 and 0.0 in this mode. These signals go through analog outputs (not shown) to generate signals $D_1$ through $D_5$ close solenoid valves leading to the five storage tanks.

T1, T2, and T3 are the temperatures at the top, middle, and bottom respectively of the column. They are brought into the Control System through analog inputs (analogue-to-digital converters). T1S, T2S, T3S are constants indicating that the column is loaded. T1 and T1S are inputs to a greater-than-or-equal-to block. It T1 is less than T1S, T10K is 0.0. If T1 is greater than or equal to T1S, T10K is 1.0. The same logic applies for T2, T2S, T3, and T3S. T10K and T20K are inputs to a logical "and" block. If both T10K and T20K are 1.0, the TK17 is 1.0. If either is not 1.0, then TK17 is 0.0. In the same manner, TK17 and T30K are input to a logical "and" block. Therefore, TR35 is 1.0, if and only if, T1 is greater than or equal to T1S, T2 is greater than or equal to T2S and T3 is greater than or equal to T3S. When TR35 is 1.0, the mode block is activated which switches control to the TOTAL REFLUX MODE.

TOTAL REFLUX MODE

This mode is similar to the START-UP MODE, TR13, MANF and TANK1, TANK2, TANK3, TANK4, TANK5 have the same values and their blocks the same inputs as in the START-UP MODE. It should be noted that the control loops for COLUMN PRESSURE and COLUMN PRESSURE DIFFERENTIAL are functioning and the COMPOSITION CONTROL LOOP is under flow control. The COLUMN PRESSURE CONTROL LOOP has a set point of 0.0 PSIG. The column can stay in this mode indefinitely until the operator initiates a change to the NORMAL MODE.

NORMAL MODE (PRODUCTION MODE)

In this mode, (FIG. 4) the proper storage tank is selected and when the desired product is coming off the column, the COMPOSITION CONTROL LOOP is activated. At other times the distillate material is under flow control. The T1 temperature is used to select the proper storage tank. When T1 is greater than or equal to a constant T11 but less than or equal to T12, then TANK1 is 1.0 (see FIG. 4) and the valve 71 to the proper tank is opened. When T1 is greater than T12 and less than T13, then TANK1 becomes 0.0 and TANK2 is 1.0 and valve 71 is closed and valve 72 is opened. When T1 is greater than or equal to T13 and the COMP (f) is less than COMPSP, then TANK2 is 0.0 and TANK3 is 1.0, and valve 72 is closed and valve 73 opened and the third tank is selected. COMP is the composition of the desired product from the proper analyzer. COMPSP is the set point for the COMPOSITION CONTROL LOOP. Note that TK24 is initialized to 1.0 at the beginning of the program or of the subroutine "PRODUCTION MODE." TK26 actuates the switch to change this initialized ONE to ZERO, when TANK4 becomes operational; thereby it is prevented that TANK3 is used again when TANK4 is no longer 1.0 because COMP falls below COMPSP. By using TK26 in this way, the third tank is selected only once. When COMP is greater than or equal to COMPSP and PVEL is less than PDELTA, then TANK3 becomes 0.0, the switch changes the initialized ONE to ZERO, TANK4 is 1.0 and the fourth tank is selected by closing valve 73 and opening valve 74. PVEL is the output of the pressure controller PID in FIG. 6 and PDELTA is a constant. This indicates the COLUMN PRESSURE is at its set point. When T1 is greater than T14 and COMP is less than or equal to COMPSP, TANK4 becomes 0.0 and TANK5 is 1.0 and the last storage tank is selected (valve 74 is closed, valve 75 opened). TK31 is initialized to 0.0. The last AND-gate thus becomes "active" only after TK26 has become 1.0 indicating the desired composition of the distillate stream has been reached and the steam has flown to tank 14 (TANK4=1.0). By using TK26, the fifth tank 15 is selected only after the fourth tank.

Figure 4:
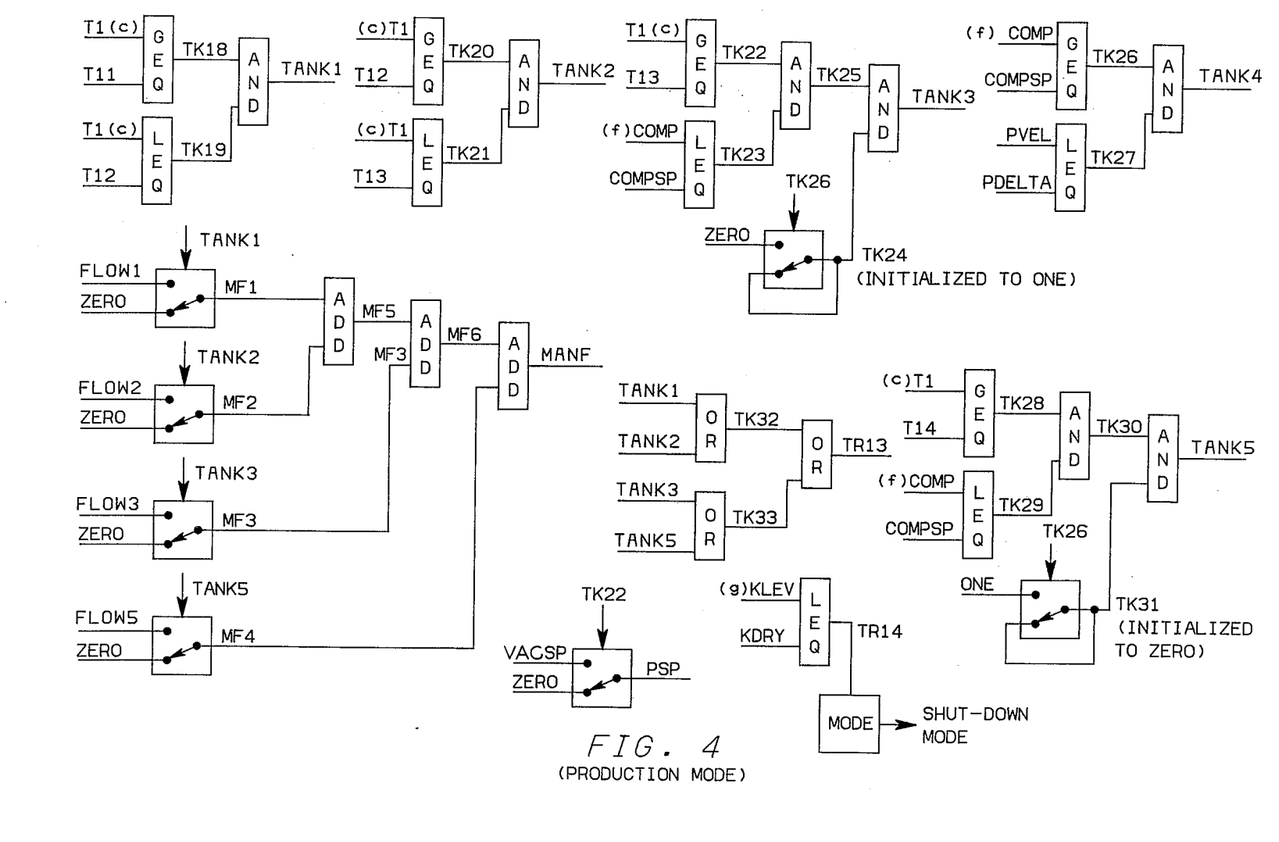
FIG. 4 shows the production mode control loop.

When TANK1 is 1.0, MF1 is equal to a constant FLOW1. Also MF5, MF6, and MANF is equal to FLOW1. This is the constant distillate flow rate while the first tank is selected. In a similar manner MANF is set equal to FLOW2, FLOW3, or FLOW5 when the second, third and fifth tank is selected.

When TANK1, TANK2, TANK3 or TANK5 is 1.0 TR13 is 1.0, this places the COMPOSITION CONTROL LOOP (FIG. 7) under flow control, see FIG. 4 (TR13) and FIG. 7 because the switch actuated by TR13 causes MANF to be used for the control. When TK22 is 1.0 i.e. after T1 has reached or passed T13 (FIG. 4) the set point to the COLUMN PRESSURE CONTROL LOOP (FIG. 6, PSP) is set equal to its vacuum set point, VACSP. When the reboiler level, KLEV, is less than or equal to a minimum level, KDRY, TR14 is 1.0. This activates the mode switch block which transfers control to the SHUT-DOWN MODE.

SHUT-DOWN MODE

Figure 6:
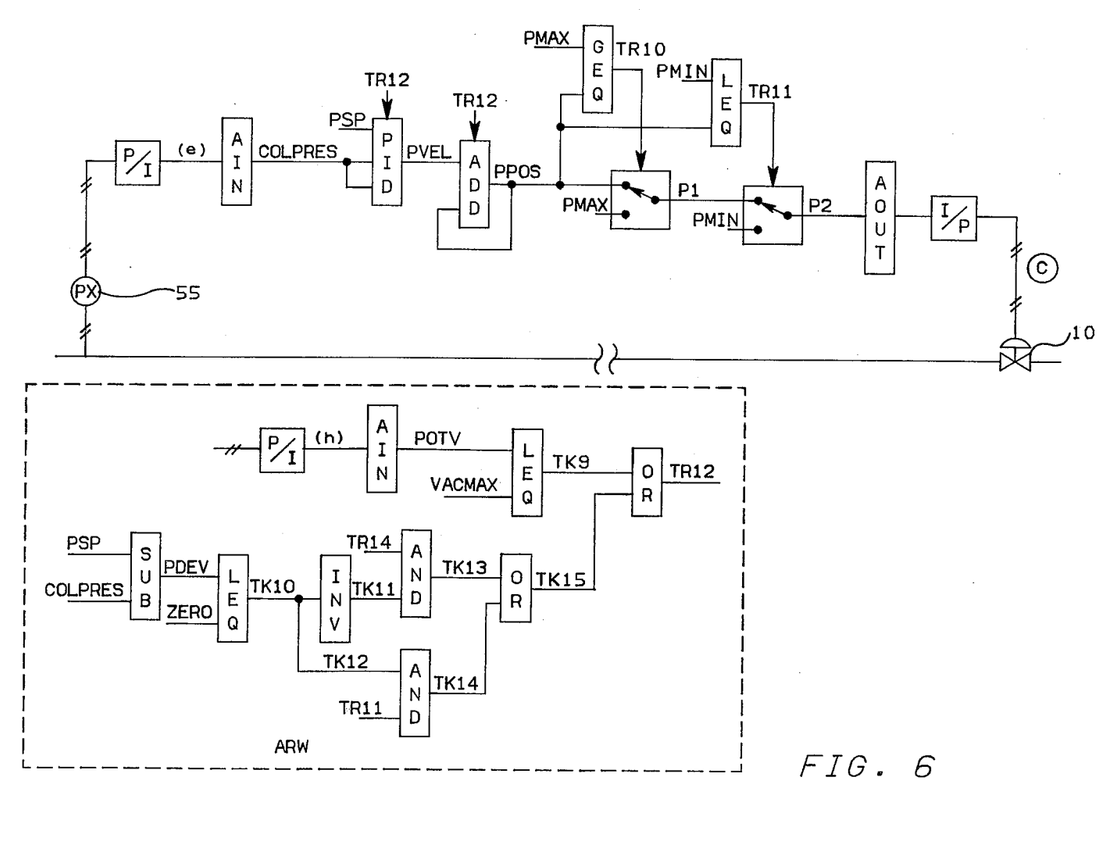
FIG. 6 shows the column pressure (vacuum) control loop.

Logic for this mode is similar to FIG. 3: TANK1, TANK2, TANK3, TANK4, and TANK5 are set to 0.0 which closes all storage tanks. TR13 is set to 1.0 and MANF is set to 0.0. The setpoints for the COLUMN PRESSURE and COLUMN PRESSURE DIFFERENTIAL, PSP and DPSP, are set to 0.0 which shuts off the steam (FIG. 5) and removes the vacuum source (FIG. 6).

COLUMN PRESSURE DIFFERENTIAL CONTROL (FIG. 5)

COLUMN PRESSURE DIFFERENTIAL is controlled by manipulating steam flow to the reboiler. COLUMN PRESSURE DIFFERENTIAL is measured at 54, signal (a). FIG. 1 and input (COLDP) FIG. 5 to a standard PID velocity algorithm controller block. The addition of the ADD block forms a position algorithm. This is the actual steam flow. This signal is compared for high and low limits, divided by a valve coefficient (SCOEF) and squared (MUL squares SF3 to SF4). This output is sent to a flow control valve. The actual flow is measured as SF7. TR1 is set equal to 1.0 to prevent reset-windup. Basically the logic sets TR1 equal to 1.0 when the variable COLDP is less than setpoint and steam rate is equal to the maximum or COLDP is greater than setpoint and steam rate is equal to the minimum.

COLUMN PRESSURE CONTROL (FIG. 6)

COLUMN PRESSURE is controlled by manipulating a valve between the overhead condenser and a source of vacuum, referred to as a vacuum pot 9 (FIG. 1). The COLUMN PRESSURE is measured at 55 and this signal (COLPRES) is input to a normal PID block as described above. High and low limits are also applied. Reset-windup is prevented when TR12 is set equal to 1.0. Again, this would occur if COLUMN PRESSURE were below set point and valve position (PPOS) were at its maximum or COLUMN PRESSURE were above its set point and valve position were at its minimum. Also, the absolute pressure in the vacuum pot is measured as signal (h) and input as POTV. When the vacuum falls below a fixed value (VACMAX), the PRESSURE CONTROL LOOP is turned off.

COMPOSITION CONTROL LOOP (FIG. 7)

When the composition of the desired product signal (f) input as COMP is greater than setpoint COMPSP, this LOOP is activated to manipulate distillate rate and control composition. This LOOP is similar to the COLUMN PRESSURE DIFFERENTIAL LOOP described above. A switch operated by TR13 is added to the LOOP to allow for fixed flow rates when RECEPTACLES 11, 12, 13, 14, or 15 are selected. Also, since the composition is usually measured by a chromatograph, dead-time compensation is required. The dead-time compensation shown here is described U.S. Pat. No. 4,054,780. Reset-windup is prevented when TR6 is equal to 1.0. This occurs when composition is below setpoint and distillate flow is at its minimum or composition is above setpoint and distillate flow rate is at its maximum.

EXAMPLE

The following is a calculated example illustrating an actual batch distillation operation.

Material charged to the distillation column 1: 2,000 gal.

| Start-up Mode: | |
|---|---|
| Reflux (line 6): | 700 gal/hr |
| Vacuum (line 8): | 0 |
| Steam (line 42): | 500 lbs/hr |
| Operational mode: | |
| (a) composition of product in line 7 flowing to receptacle 11: | 90% C$_2$H$_4$ |
| (b) composition of product flowing in line 7 to receptacle 12: | 90% Toluene |
| (c) composition of product flowing in line 7 to receptacle 13: | <99.7% IBB |
| (d) composition of product flowing in line 7 to receptacle 14: | 99.7% IBB |
| (e) composition of product flowing in line 7 to receptacle 15: | >0.3% NBB |

IBB: isobutyl benzene
NBB: n-butyl benzene

Temperature setpoints for:
Top temperature 225° F.
Intermediate temperature 265° F.
Bottom temperature 380° F.
Differential pressure 120 in. H$_2$O
Top pressure
(a) during the normal operation 14.7 psia
(b) during the filling of tank 13, 14, 15 10.8 psia

I claim:

1. Batch distillation process for recovering a portion of a kettle feed material in the form of one or more product streams from the overhead of a distillation column, said process comprising
   (a) a start-up operation including the steps of providing a computer means and manipulating said computer means for
      (aa) automatically heating a kettle of a distillation column,
      (bb) automatically maintaining the overhead effluent line of said distillation column closed
      (cc) automatically determining at least one distillation process parameter and generating a start-up signal responsive thereto,
      (dd) automatically comparing said start-up signal with a start-up setpoint,
   (b) a production operation including the steps of providing a computer means and manipulating said computer means for
      (aa) automatically generating a production signal when said start-up signal has reached said start-up setpoint,
      (bb) automatically opening said overhead effluent line responsive to said production signal,
      (cc) automatically directing at least a portion of said overhead effluent from said distillation column to a selected receptacle,
      (dd) automatically operating the distillation column such as to recover one or more separate product streams from said overhead effluent line, at least one of said separate product streams being a composition controlled main product stream
      (ee) automatically determining at least one operational parameter and generating a shut-down signal responsive thereto,
   (c) a shut-down operation comprising automatically shutting down the distillation column when said shut-down signal has reached a given shut-down setpoint.

2. Process in accordance with claim 1 wherein said production signal is generated when both said start-up signal has reached said start-up setpoint and an extraneous switch signal has been given.

3. Process in accordance with claim 1 comprising
   (a) automatically determining the pressure differential between the top and the bottom of the distillation column and generating a pressure drop signal responsive thereto,
   (b) responsive to said pressure drop signal and a pressure drop setpoint signal controlling the heat input into the distillation column.

4. A process in accordance with claim 3 comprising
   (a) automatically determining at least one temperature of the distillation column and generating said start-up signal responsive thereto.

5. Process in accordance with claim 4 comprising
   (a) automatically determining the temperature of at least three locations in the distillation column, namely in a top, an intermediate and a bottom position of the distillation column,
   (b) generating corresponding temperature signals,
   (c) automatically comparing each of said temperature signals with respective temperature setpoint signals,
   (d) automatically generating said production signal when all of said temperature signals equal or exceed their respective setpoints.

6. A process in accordance with claim 1 wherein the overhead effluent is directed in a flow-controlled manner to the respective recipient.

7. Process in accordance with claim 1 comprising during the production operation the following steps:
   (a) directing the overhead effluent in a flow controlled manner to the respective recipient,
   (b) automatically generating a top temperature signal representative of the temperature in the top portion of the distillation column,
   (c) automatically comparing said top temperature signal with at least one top temperature setpoint signal,
   (d) automatically responsive to said comparison and when said top temperature has reached or exceeded said top temperature setpoint directing said overhead effluent to another recipient.

8. Process in accordance with claim 7 wherein said flow of said overhead effluent to said another recipient is controlled responsive to a composition signal generated responsive to an automatic determination of the composition of the overhead effluent.

9. Process in accordance with claim 8 comprising
   (a) seriatim generating overhead flow switch signals whenever the top temperature signal in the distillation column has reached or exceeded one of a series of temperature setpoints,
   (b) responsive to the individual overhead flow switch signals switching the overhead flow from one recipient to another recipient,
   (c) after the temperature has exceeded the last top temperature setpoint directing the flow of the overhead effluent automatically to a recipient while controlling the flow of the overhead effluent responsive to an automatically generated composition signal representative of the composition of the overhead effluent.

10. Process in accordance with claim 8 comprising
    (a) seriatim generating overhead flow switch signals whenever the top temperature signal in the distillation column has reached or exceeded one of a series of temperature setpoints,
    (b) responsive to the individual overhead flow switch signals switching the overhead flow from one recipient to another recipient,
    (c) after the temperature has exceeded the last top temperature setpoint and after also a composition signal has indicated that the composition of the distillate stream is equal to or above a setpoint, directing the flow of the overhead stream in a composition controlled flow to a key receptacle,
    (d) when said composition controlled flow of said overhead stream is directed to said key receptacle, automatically turning off the control that permitted the switching of the overhead stream to the receptacle just prior to the key receptacle and turning on the control to permit the switching of the flow of the overhead stream from a flow into the key receptacle to a flow into a receptacle following the key receptacle when the conditions for flow into the key receptacle no longer prevail.

11. Process of claim 10 wherein the flow of the overhead stream is switched from said flow into the key receptacle to a flow into said receptacle following the key receptacle when a first and a second key flow end signal coexist, the first key flow end signal being representative of the column top temperature being equal to or greater than a setpoint and the second key flow end signal being representative of the composition of the overhead stream being less than or equal to a composition setpoint.

12. Process in accordance with claim 1 wherein the liquid level in the distillation column is automatically determined and said shut-down signal is generated responsive thereto.

13. Process in accordance with claim 12 wherein responsive to the shut-down signal
 (a) the flow of the overhead effluent to all of the recipients is stopped and all of the overhead is condensed and reintroduced into the top of the distillation column, and
 (b) the column controller and pressure controllers are deactivated.

14. Process in accordance with claim 1 wherein said distillation column is operated under controlled pressure.

15. Process in accordance with claim 14 wherein the distillation column is operated under a first given pressure in the top of the distillation column while said overhead effluent is directed to one recipient or a series of recipients responsive to the top temperature signal and operating the distillation column under a second given pressure lower than said first given pressure while the flow of the overhead effluent is composition controlled.

16. Process in accordance with claim 15 wherein the top of the distillation column is automatically connected to a vacuum source while said flow of said overhead effluent is composition controlled.

17. Process of claim 1 comprising following the start-up operation a total reflux operation wherein the process is held essentially at the operation obtained at the end of the start-up operation until one or both of
 (aa) a pressure switch signals representative of one or more pressure parameters in the process having reached a given range or value, and
 (bb) a reflux-to-production signal permit the switching of the operation from total reflux to production.

* * * * *

UNITED STATES PATENT AND TRADEMARK OFFICE
CERTIFICATE OF CORRECTION

PATENT NO. : 4,328,073
DATED : May 4, 1982
INVENTOR(S) : Merle R. Likins, Jr.

It is certified that error appears in the above—identified patent and that said Letters Patent is hereby corrected as shown below:

Column 12, claim 10, line 58, "receptable" should read --- receptacle ---

Signed and Sealed this

Thirteenth Day of July 1982

[SEAL]

Attest:

GERALD J. MOSSINGHOFF

Attesting Officer    Commissioner of Patents and Trademarks